United States Patent [19]

Dekker et al.

[11] Patent Number: 5,084,604
[45] Date of Patent: Jan. 28, 1992

[54] METHOD OF SEVERING A PLATE OF BRITTLE MATERIAL

[75] Inventors: Jacob N. Dekker, Drachten; Maarten H. Zonneveld, Eindhoven; Ireneus H. T. Fierkens, Eindhoven; Theodorus J. M. J. van Gennip, Eindhoven; Peter L. Holster, Eindhoven, all of Netherlands

[73] Assignee: U.S. Philips Corporation, New York, N.Y.

[21] Appl. No.: 521,207

[22] Filed: May 7, 1990

[30] Foreign Application Priority Data

May 8, 1989 [NL] Netherlands ............ 8901143

[51] Int. Cl.$^5$ .................................. B23K 26/00
[52] U.S. Cl. ..................... 219/121.72; 219/121.67
[58] Field of Search ............ 219/121.67, 121.72

[56] References Cited

U.S. PATENT DOCUMENTS

| 3,453,097 | 7/1969 | Hafner | 65/112 |
| 4,467,168 | 8/1984 | Morgan et al. | 219/121.67 |
| 4,468,534 | 8/1984 | Bouddicker | 219/121.67 |
| 4,562,333 | 12/1985 | Taub et al. | 219/121.69 |

Primary Examiner—C. L. Albritton
Attorney, Agent, or Firm—Norman N. Spain

[57] ABSTRACT

The invention relates to a method of asymmetrically severing a plate (3) of brittle material, in which by means of a heat source (5) a thermal load is provided along a heating track asymmetrically with respect to the desired cutting line (7) and the plate (3) is severed along the desired cutting line (7).

7 Claims, 3 Drawing Sheets

METHOD OF SEVERING A PLATE OF BRITTLE MATERIAL

BACKGROUND OF THE INVENTION

The invention relates to a method of severing a plate of brittle material, in which a thermal load is provided along a heating track on at least one major surface of a plate to be severed, which has in a side a crack initiation as initiation for a crack, as a result of which stresses are produced in the plate, which, starting from the crack initiation, cause a crack square with the surface along a desired cutting line.

A method of the kind to which the present invention relates is known from DE 28,13,302 C2. In this known method, a crack initiation is provided in a side of a flat glass plate, the plate is heated in one of two consecutively arranged regions symmetrical with respect to the desired cutting line and is cooled in the other of these regions. A a result of which, due to temperature gradients, thermal stresses are produced in the plate, which cause a crack, starting from the crack initiation. When the plate is severed symmetrically, the crack follows the desired cutting line. However, when the plate is severed asymmetrically, the crack deviates from the desired cutting line.

SUMMARY OF THE INVENTION

The invention has for its object to provide a method of the kind described above, by means of which a plate of brittle material is severed accurately and rapidly along a desired cutting line. According to the invention, this object is mainly achieved by a method in which the thermal load is provided asymmetrically with respect to the desired cutting line in such a manner that the plate is severed asymmetrically along the desired cutting line. By means of this method according to the invention, it is possible to cut along a straight line and along contours without deviations of the crack occurring with respect to the desired cutting line.

When the plate is severed asymmetrically according to the known method from DE 28,13,302 C2, two kinds of deviations occur: lateral deviations, i.e. deviations of the crack with respect to the desired cutting line in a major surface of the plate, and squareness deviations, i.e. deviations of the crack with respect to a surface, starting from the desired cutting line and transverse to a major surface of the plate. Those deviations are due to mechanical asymmetry. When a plate is severed asymmetrically, the plate is subdivided into two strips having different widths.

During severing, the material along the crack has a higher temperature than the surrounding material and consequently the thermal expansion of the material along the crack is greater than that of the surrounding material. As a result, the strips of material on either side of the crack warp: the strips bend away from the crack.

However, the narrow strip bends more strongly than the wide strip due to the fact that the latter is connected to a larger quantity of cold material and is thus prevented from bending away from the crack. The stress in the material close to the crack tip in the direction of the crack is thus greater on the side of the wider strip; the condition of stress is asymmetrical. Ultimately, a shear load is formed on the material immediately in front of the crack tip. As a result, the crack will change in direction towards the narrow strip and will follow no longer below the desired cutting line. As the lateral deviation of crack becomes larger, the shear load becomes smaller until with a sufficient lateral deviation the shear load has become zero and the condition of stress around the crack tip is symmetrical.

The value of the lateral deviation is determined by a larger number of parameters, such as: thermal and mechanical properties of the material, power, shape and dimension of the heat source and geometrical parameters, such as dimensions of the plate and the position of the crack in the plate.

The squareness deviations occur, for example, when the thermal load is provided only on one major surface of the plate to be severed. The heated or cooled zone on the other major surface is larger due to diffusion. The lateral deviation is thus different on the two major surfaces. Both deviations are therefore due to the difference in width and hence in rigidity of the strips of material on either side of the crack, i.e. to mechanical asymmetry. These deviations occur both when cutting along a straight line and when cutting along contours.

By means of the method according to the invention, the thermal load is provided along a heating track which is such that the stresses in the material of the plate close to the crack tip are symmetrical when the crack tip is located on the desired cutting line. Thus, no lateral and squareness deviations occur with respect to the desired cutting line. The plate is severed asymmetrically along the desired cutting line. By this method, it is possible to cut along a straight line and along contours.

Figure 1:
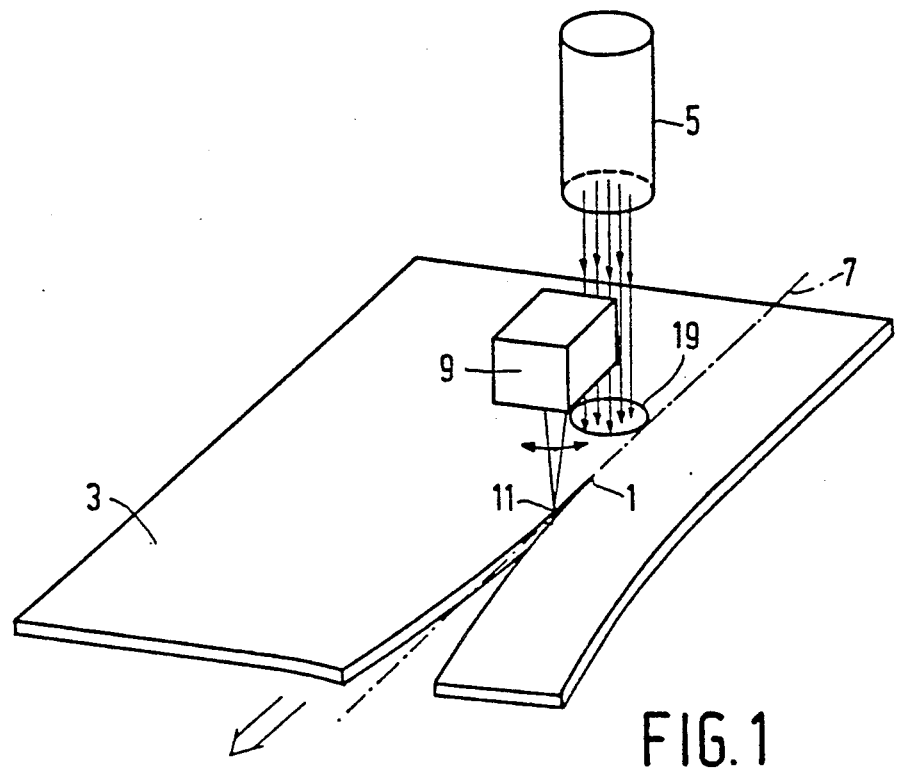
FIG. 1 shows diagrammatically an embodiment of a method according to the invention, in which the crack tip position is measured mechanically.

In a preferred embodiment of the method according to the invention, a spot-shaped heat source and the plate to be severed are moved with respect to each other, any deviation of the crack with respect to the desired cutting line being fed back and the relative movement being readjusted. The position of the crack tip is measured during severing. When the measured position does not lie on the desired cutting line, the spot-shaped heat source is moved with respect to the plate to be severed in such a manner that the crack follows the desired cutting line. Deviations are immediately corrected.

The position of the crack tip may be measured, for example, mechanically, acoustically or optically. In the case of mechanical measurement, a scanner with a sharp point scanning the crack should follow the source. Apart from the usual disadvantages of mechanical contact, a great disadvantage is that the position of the crack up cannot be measured at the area of the crack tip because the point of the scanner always has a finite radius, whereas the crack opening at the area of the crack tip is nihil. The scanner will then have to move at a certain distance behind the crack tip. This gives rise to inaccuracies in the system so that this is at the expense of the accuracy with which there can be adjusted.

Acoustic measurement is an alternative. It is known that acoustic waves produced in the plate are reflected by a crack. The position of the crack and of the crack tip can be derived from the connection between emitted waves and reflected waves.

The most promising method consist in optically measuring the position of the crack tip. This can be effected by a method in which the region around the crack tip is recorded by means of a video camera following the movement of the source. As a matter of course, the plate may also be moved with respect to the source and with respect to the camera. The illumination and the wavelength of the light to be used depend upon the material to be cut. For a material such as glass a visible-light camera may be used, while the illumination can take place through the glass plate so that the camera "sees" the reflections on the crack. On the contrary, silicon is not transparent to visible light, but is transparent to infrared light. Use could then be made of an infrared light source and camera. With a material which is not sufficiently transparent for any camera, the crack can be "seen" by reflection of incident light. In this case, however, it will be much more difficult to obtain a clear image of the crack. When once an image of the extending crack has been obtained, the position of the crack tip can be calculated by means of image processing techniques. This information is then fed back to control the relative movement. The spot of the spot-shaped heat source may be circular, oval or elongate. With an elongate spot, the longitudinal direction of the spot is chosen to be parallel to the desired cutting line. As a result, the material around the crack tip and in the direction of the desired cutting line is heated more satisfactorily.

In a further embodiment of the method according to the invention, both the relative speed of the spot-shaped heat source with respect to the plate in the direction of the desired cutting line and the relative displacement of the spot-shaped heat source with respect to the plate at right angles to the direction of the desired cutting line are readjusted by feedback. By these measures, the relative movement of the spot-shaped heat source is readjusted. The two measures are not dependent upon one another. A change of the relative speed influences the position of the crack tip in and transverse to the desired direction of the cutting line. By increase of the relative speed, the lateral deviation is reduced, and conversely. Besides, due to the relative movement of the spot-shaped heat source with respect to the plate transverse to the direction of the desired cutting line, the position of the crack tip will also change in the direction of the desired cutting line. It is also possible to correct the position of the crack tip by adapting the thermal power of the spot-shaped heat source.

In another embodiment of the method according to the invention, the thermal load is provided on the plate along a predetermined heating track, which does not coincide with the desired cutting line. Apart from a small stochastic variation, the lateral deviation is a reproducing phenomenon, that is to say that upon repeated severing of identical plates the deviation is substantially the same. By adapting the heating track, the stress around the crack tip can thus be influenced and the lateral deviation can be reduced. From a viewpoint of adjustment technique, this can be designated as positive feedback. The exact shape of the heating track can be determined by experiments or by calculation. This method has great advantages when large numbers of identical plates are severed in the same manner.

In a still further embodiment of the method according to the invention, a stationary linear heat source is used, whose shape corresponds to that of the heating track. The exact shape of the line source is determined empirically or by calculation. The shape of the line source will have a curvature towards the wide strip so that the wide strip becomes warmer and bends away from the crack over the same distance as the narrow strip. The stress around the crack tip is then symmetrical. The severing of plates with a linear heat source is effected very rapidly.

In a further embodiment of the method according to the invention, a spot-shaped heat source is used, which is moved along the heating track by a relative movement of the heat source with respect to the plate. The heating track along which the spot-shaped heat source is moved is predetermined empirically or by calculation. This in contrast with the aforementioned embodiment, in which the heating track of the spot-shaped heat source is determined by feedback. The heating track with the use of a spot-shaped heat source deviates from the heating track with the use of a linear heat source because the thermal load is different. The use of a spot-shaped heat source is particularly advantageous when cutting contours into the plate.

In a still further embodiment of the method according to the invention, several heat sources are used. By a suitable combination of several heat sources, the stress around the crack tip can be kept symmetrical. Several heat sources can be used when severing a plate with feedback and with positive feedback. Instead of several heat sources, also a combination of heat and cold sources may be used. A cold source is then considered as a negative heat source. When the heat sources do not influence each other thermally, the overall thermal load due to several heat sources is found by superimposition of the stress distributions due to the separate sources.

The invention will be described more fully with reference to a few embodiments and the Figures.

In the drawing:

FIG. 1 shows an embodiment of the method according to the invention, in which the position of the crack tip 1 is measured mechanically. The plate 3 and the spot-shaped heat source 5 are moved with respect to each other, the position of the crack tip 1 with respect to the desired cutting line 7 being measured by a scanner 9 with a sharp point 11 and deviations being fed back and the relative movement being readjusted.

Figure 2:
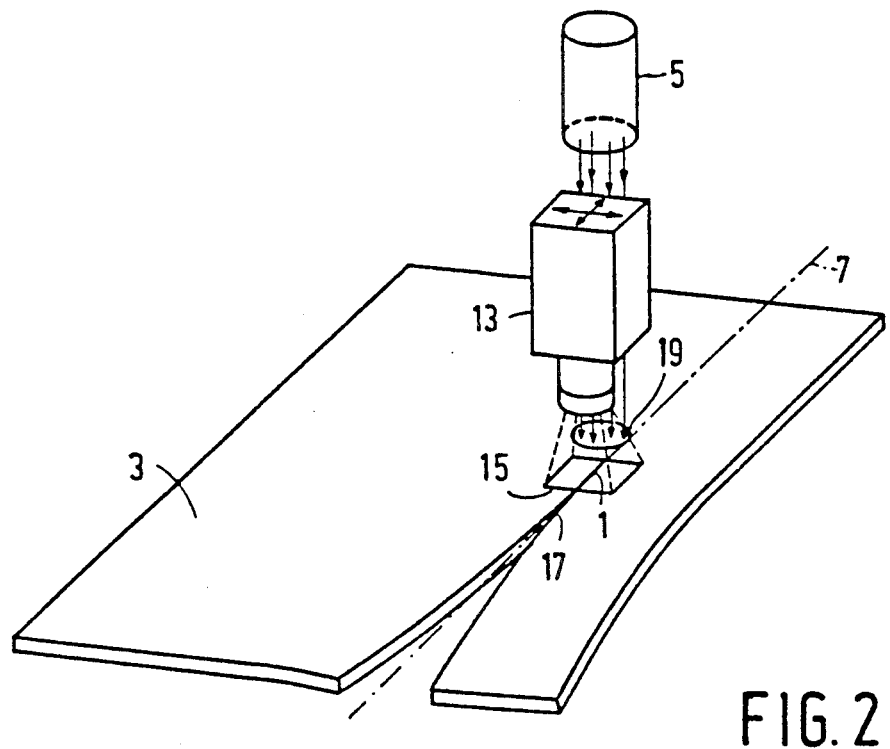
FIG. 2 shows diagrammatically another embodiment of a method according to the invention, in which the crack tip position is measured optically.

FIG. 2 shows an embodiment of the method according to the invention, in which the position of the crack tip 1 is measured optically. The parts corresponding to FIG. 1 are provided with the same reference numerals. The spot-shaped heat source 5 is moved over the plate 3. Instead of the scanner, in this embodiment use is made of a video camera 13, which follows the movement of the source and records the region 15 around the crack tip 1. When the image of the extending crack 17 has been obtained, the position of the crack tip 1 with respect to the desired cutting line 7 can be calculated by means of image processing techniques. This information is then fed back to control the position and the speed of the heat source 5 with respect to the plate 3.

Figure 3:
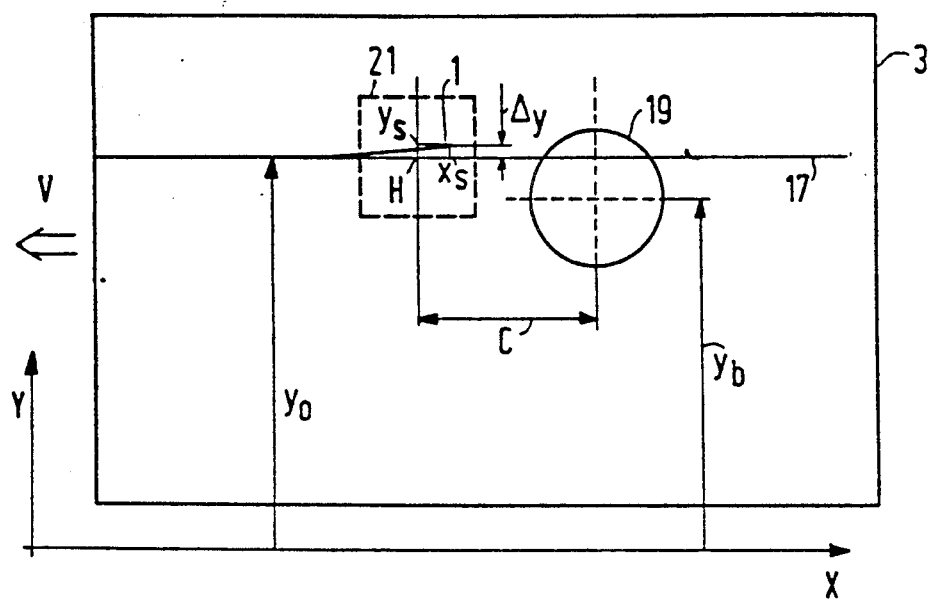
FIG. 3 shows the adaptation of the relative movement by feedback with a rectilinear cleavage.

FIG. 3 shows diagrammatically the adaptation of the relative movement of the spot-shaped heat source with respect to the plate 3 with rectilinear severing. FIG. 3 shows a circular spot 19 and the image field 21 of the camera. The desired cutting line 7 extends parallel to the X axis. The position of the image field 21 is adjusted so that the center H coincides with the desired cutting line 7. The camera not shown and the spot 19 are fixed in the X direction at a relative distance C. The spot 19 can be moved freely in the Y direction, however. (With the use of a laser as heat source, this may be effected, for example, by means of a mirror or lens rotating about the X axis.) The plate 3 is moved in the negative X direction. The severing process and the camera are considered as a "black box" process with two parameters at the input: the y position $y_b$ of the spot 18 and the speed V, and with two parameters at the output: the x and y positions $x_s$ and $y_s$ of the crack tip 1 with respect to the center H of the camera image field 21. The y value $y_s$ is equal to the deviation $\Delta y$ of the crack 17 with respect to the desired cutting line 7; it is compared with the desired value of $\Delta y$, $\Delta y=0$. The difference is fed back through a regulator to the y position $y_b$ of the spot 19: if $\Delta y>0$, the y position $y_b$ is made smaller, and conversely. The x value $x_s$ of the position of the crack tip 1 is used to adjust the speed V; in fact, moving of that the crack tip 1 out of the image field 21 of the camera has to be avoided. The desired value of $x_s$ is set, for example, to zero so that the desired position of the crack tip 1 coincides with the center H of the image field 21 of the camera. If $x_s$ is positive, the speed V is increased: with a negative $x_s$, the speed V is reduced. This adjustment may be omitted if the position of the crack tip 1 with respect to the spot-shaped heat source 19 substantially does not vary along the whole cutting line 7. The speed V can then be kept constant along the whole crack.

The two adjustments are not independent of one another. A change of the speed V influences not only the x position $x_s$, but also the y position $y_s$ of the crack tip 1. Upon increase of the speed V, the lateral deviation $\Delta y$ will decrease. Besides, when the y position $y_b$ of the spot 19 changes, not only the y position $y_s$ of the crack tip 1, but also the x position $x_s$ will change. This cross connection should be taken into account when designing the regulators.

Figure 4:
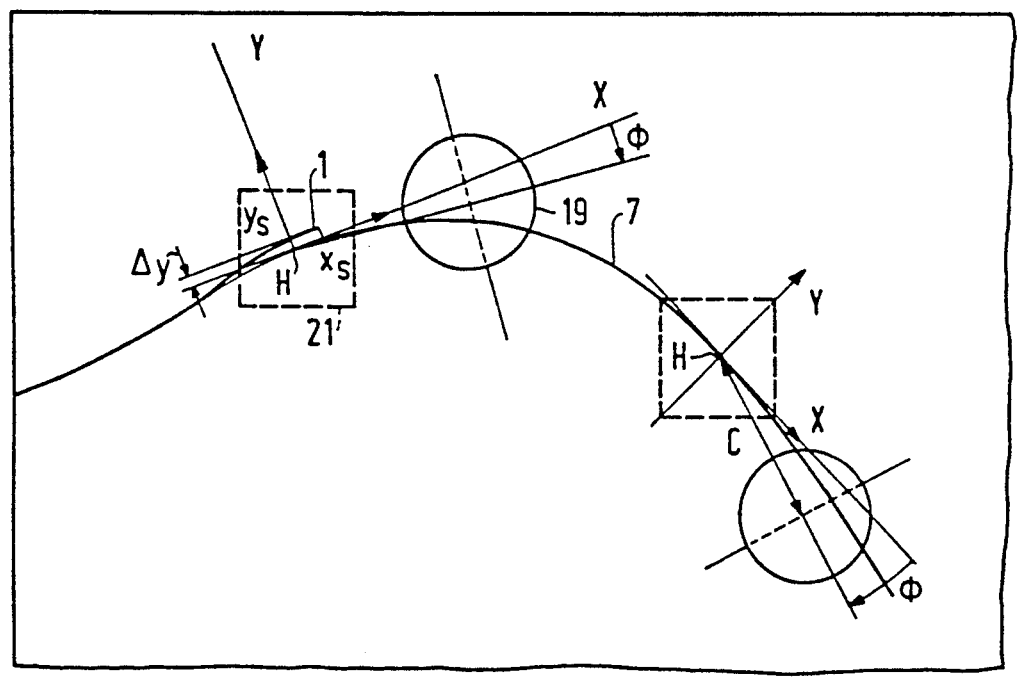
FIG. 4 shows the adaptation of the relative movement by feedback with a contour cleavage.

FIG. 4 shows diagrammatically the adaptation of the relative movement by feedback with contour severing. In the case of contour severing, the crack tip 1 can in principle occupy all positions with respect to the hot spot 19. The method as described in FIG. 3 cannot be used here. A solution to prevent the crack tip 1 from moving out of the image field 21 of the camera, is shown in FIG. 4. The desired position of the crack tip 1 coincides with the center H of the image field 21. The center H of the image field 21 is moved along the desired cutting line 7. From the desired cutting line 7, also the orientation of a local coordinate system is determined having as origin the center H of the image field 21 in such a manner that the X axis is tangent to the desired cutting line 7. The position of the crack tip 1 is determined with respect to this local coordinate system. The spot 19 now cannot perform a translatory movement with respect to the camera, as in FIG. 3, but can perform a rotary movement about the center H of the image field 21. The y position $y_s$ of the crack tip 1 is now used to adjust the position of the spot 19 with respect to the center H of the image field 21: if $y_s$ is positive, the spot 19 is rotated clockwise, whereas with a negative $y_s$ the spot 19 is rotated counterclockwise. The x position $x_s$ is used to adjust the tangential speed.

Theoretically, it would be possible that in this manner the lateral deviation is not entirely adjusted to zero because the lateral deviation of the hot spot 19 has a maximum. In fact, the latter is equal to the distance C between the image center H and the hot spot 19. This is achieved when an angle $\phi$ is equal to 90°. It can then be necessary to add an additional freedom of movement of the hot spot 19 with respect to the camera image 21, for example a completely free movement of the hot spot 19 in the X and Y directions or a tangential translation superimposed on the rotary movement. In most cases, however, this will not be necessary. Besides other positionings and movements of the image field with respect to the hot spot are possible. They are all due to the same principle of track correction by means of feedback. As a matter of course, this principle for contour cutting may also be used for rectilinear cutting.

Figure 5:
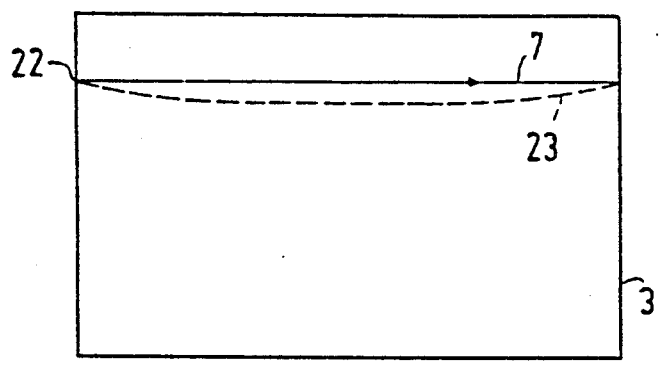
FIG. 5 shows diagrammatically an embodiment of the pre-adaptation of the heating track with rectilinear cleavage.

FIG. 5 shows diagrammatically an embodiment of the pre-adaptation of the heating track 23 with rectilinear severing. A plate 3 is severed asymmetrically along a desired cutting line 7 by adaptation of the heating track 23. The heating track 23 is determined empirically or by calculations. The shape of the track 23 depends upon the chosen heat source: a spot source or a line source.

Figure 6:
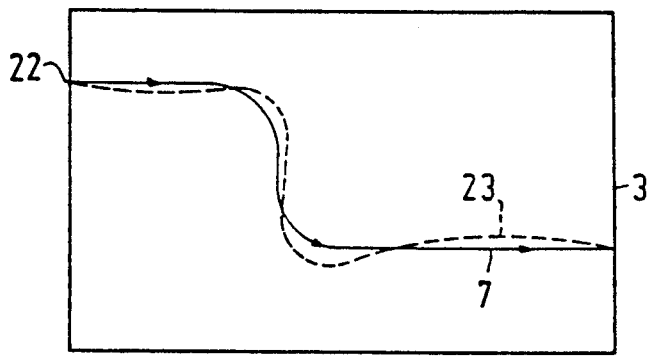
FIG. 6 shows diagrammatically an embodiment of the pre-adaptation of the heating track with contour cleavage.

FIG. 6 shows diagrammatically an embodiment of the pre-adaptation of the heating track 23 with contour severing. Also in this case, the heating track 23 depends upon the heat source chosen. The heating track 23 does not coincide with the desired cutting line 7.

These two embodiments are based on the principle of track correction by means of positive feedback. Both with the principle of positive feedback (freed forward) and with the principle of feedback, the stress around the crack tip is made symmetrical so that the crack follows the desired cutting line 7.

Figure 7:
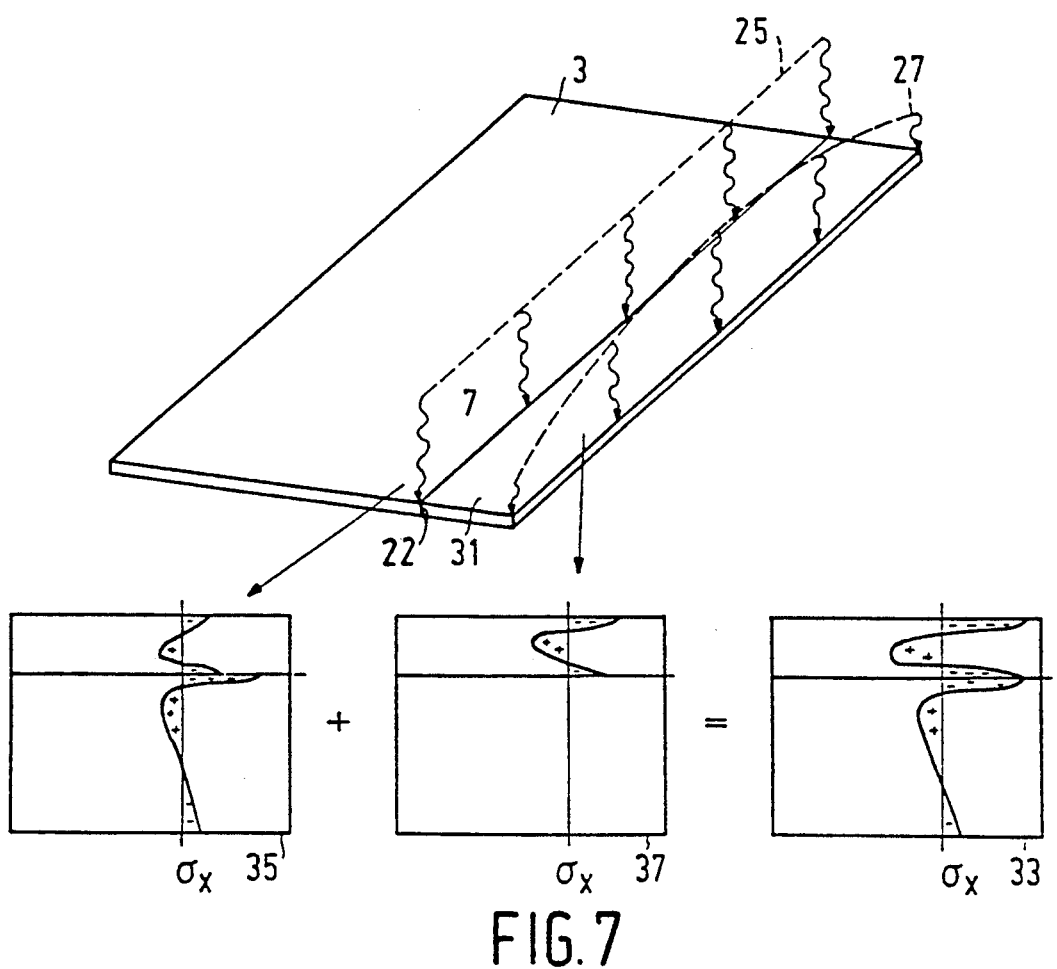
FIG. 7 shows the adaptation of the thermal load by addition of an additional heat source.

FIG. 7 shows the adaptation of the thermal load by addition of an additional heat source. A plate 3 is thermally severed asymmetrically along a straight line. In a usual manner, the desired cutting line 7 is heated by means of a linear heat source 25, but in this case a further a non-uniform thermal load is provided on the narrow strip 31 by means of another linear source 27. The stress distribution 33 can now be found from the superimposition of the stress distributions 35, 37 due to both separate sources 25, 27. The additional source 27 ensures that the stress on the upper side of the crack 17 increases. With a suitable dimensioning, the stress distribution 33 will be accurately equal on either side of the crack 17 and a shear load will not be formed.

Various kinds of materials can be severed by means of the method described. The material should be brittle, however, such as, for example, glass or silicon. A great advantage is that upon severing no splinters and chips are formed, which can damage the surfaces of the narrow and wide strips. As crack initiation a provided scratch or an unevenness in the side wall of the material may be used. A major surface of the plate to be severed can be both planar and curved.

We claim:

1. A method of severing a plate of brittle material, in which a crack initiation is provided in a side of a plate of brittle material as initiation for a crack, after which a thermal load is provided along a heating track on at least one major surface of a plate to be severed, as a result of which stresses are produced in the plate, which, starting from the crack initiation, cause a crack square with the major surface along the desired cutting line, characterized in that the thermal load is provided asymmetrically with respect to the desired cutting line in such a manner that the plate is severed asymmetrically along the desired cutting line.

2. A method as claimed in claim 1, characterized in that a spot-shaped heat source and the plate to be severed are moved with respect to each other, a deviation of the crack with respect to the desired cutting line being fed back and the relative movement being readjusted.

3. A method as claimed in claim 2, characterized in that both the relative speed of the spot-shaped heat source with respect to the plate in the direction of the desired cutting line and the relative displacement of the spot-shaped heat source with respect to the plate at right-angles to the direction of the desired cutting line are readjusted by feedback.

4. A method as claimed in claim 1, characterized in that the thermal load is provided on the plate along a predetermined heating track, which does not coincide with the desired cutting line.

5. A method as claimed in claim 4, characterized in that a stationary linear heat source is used, whose shape corresponds to that of the heating track.

6. A method as claimed in claim 4, characterized in that a spot-shaped heat source is used, which is moved along the heating track by a relative movement of the heat source with respect to the plate.

7. A method as claimed in claim 1, characterized in that several heat sources are used.

* * * * *